(12) United States Patent
Shirayanagi (10) Patent No.: US 6,318,857 B1
(45) Date of Patent: Nov. 20, 2001

(54) VARIABLE POWER SPECTACLES

(75) Inventor: Moriyasu Shirayanagi, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,935

(22) Filed: Dec. 7, 1999

(30) Foreign Application Priority Data

Dec. 9, 1998 (JP) .................................................. 10-350385

(51) Int. Cl.⁷ ...................................................... G02C 1/00
(52) U.S. Cl. ............................................. 351/41; 351/158
(58) Field of Search ........................... 381/41, 158, 159, 381/49, 44; 359/407, 410, 554, 557, 666, 665, 667; 396/52, 55

(56) References Cited

U.S. PATENT DOCUMENTS

| 5,229,885 | 7/1993 | Quaglia . |
| 5,526,067 | 6/1996 | Cronin et al. . |
| 5,684,637 | 11/1997 | Floyd . |
| 5,966,239 | 10/1999 | Shirayanagi et al. ................. 359/481 |
| 6,040,947 * | 3/2000 | Kurtin et al. ......................... 359/666 |

FOREIGN PATENT DOCUMENTS

| 0837603 | 4/1998 | (EP) . |
| 55-64209 | 5/1980 | (JP) . |
| 63-24217 | 2/1988 | (JP) . |
| 2-166417 | 6/1990 | (JP) . |
| 8-179239 | 7/1996 | (JP) . |
| 91/17463 | 11/1991 | (WO) . |

OTHER PUBLICATIONS

*Handbook of Ophthalmic Optics, Second Edition*, Japan Ophthalmic Professional School, pp. 64–66, ISBN4–307–77000–5, with English translation.

* cited by examiner

*Primary Examiner*—Hung Xuan Dang
(74) *Attorney, Agent, or Firm*—Greenblum & Bernstein, P.L.C.

(57) ABSTRACT

Variable power spectacles having a pair of visual optical systems. Each of the visual optical systems includes a variable power lens and a variable angle prism. The spectacles is further provided with a first adjusting mechanism for adjusting focal power of the variable power lens, a second adjusting mechanism for adjusting prismatic power of the variable angle prism, and a linking mechanism. The first adjusting mechanism varies the curvature of the front surface of the variable power lens to change the focal power. The second adjusting mechanism varies the inclination angle of the front surface of the variable angle prism to change the prismatic power. The linking mechanism associates the adjustment by the first adjusting mechanism with the adjustment by the second adjusting mechanism to link one of the adjustments with the other adjustment.

17 Claims, 8 Drawing Sheets

VARIABLE POWER SPECTACLES

BACKGROUND OF THE INVENTION

The present invention relates to variable power spectacles whose refractive power is adjustable to supplement accommodation power of eyes.

Japanese Patent Provisional Publication Nos. Sho 55-64209 and Sho 63-24217 disclose the variable power spectacles. The variable power spectacles are provided with a pair of variable power lenses and an adjusting mechanism that adjusts the focal power of the variable power lenses. The variable power lens disclosed in the publications has a flexible hull that is filled by transparent liquid. The adjusting mechanism infuses or discharges the transparent liquid into or from the flexible hull to deform the variable power lens, which changes the curvature of the lens, varying the focal power of the lens continuously.

However, since the variable power lens disclosed in the publications only adjusts the focal power (i.e., focal length), the adjustment disturbs balance between accommodation and vergence of eyes, which becomes a burden on the eye when the spectacles are worn for a long time. Further, the extreme unbalance disables binocular vision.

Figure 12:
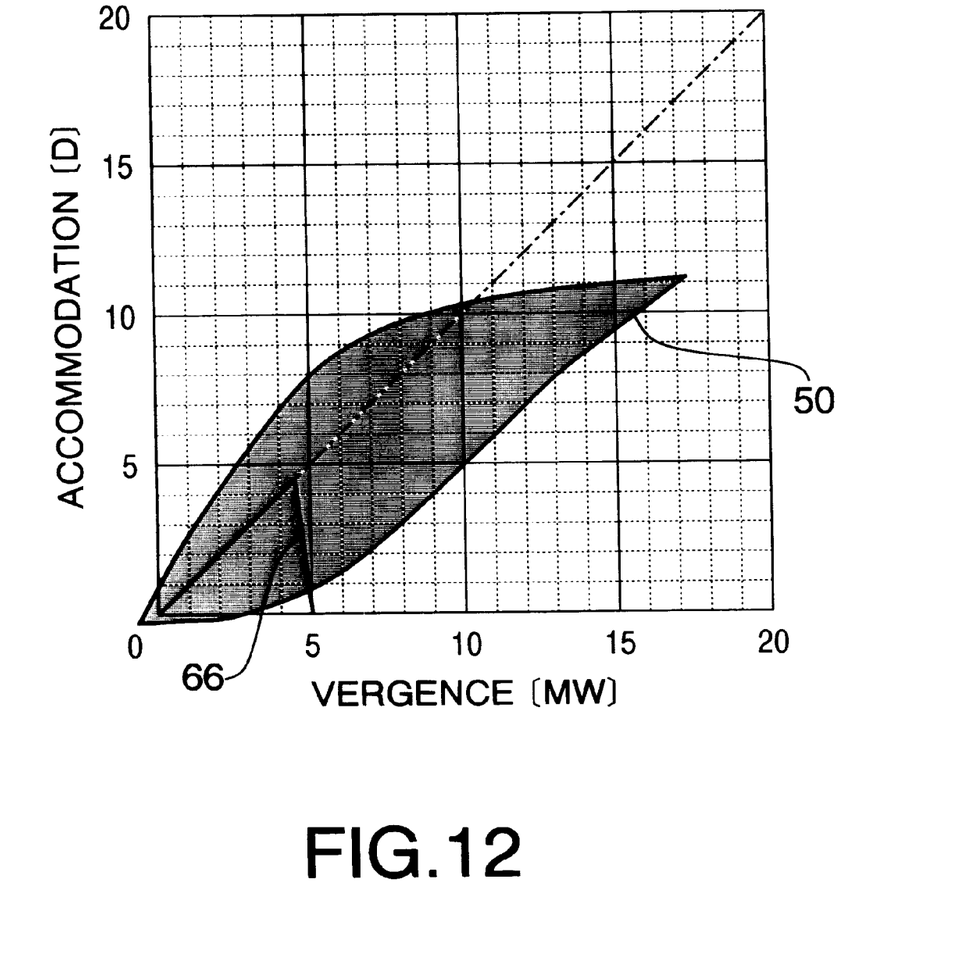
FIG. 12 is a graph showing relationship between the accommodation and the vergence of eyes when the conventional variable power spectacles are worn.

According to a physiological optics research, it has been understood that accommodation and vergence of eyes should be balanced for good binocular vision and the unbalance disturbs comfortable binocular vision. The vergence means convergence when lines of sights move to inside and means divergence when liens of sights move to outside. FIG. 12 is a graph showing a relationship between the accommodation and the vergence. It has been known that binocular vision is possible only when the relationship between the accommodation and the vergence is represented by a coordinate point included within the area surrounded by a curve 50 in FIG. 12.

However, the adjustment in the conventional variable power spectacles is represented by a straight line 66, for example. If the focal power is adjusted along the line 66, the balance between the accommodation and the vergence is disturbed to disable the binocular vision at the small accommodation.

SUMMARY OF THE INVENTION

It is therefore an object of the present invention to provide improved variable power spectacles, which is capable of keeping a comfortable binocular vision even when the spectacles are worn for a long time without disturbing the balance between the accommodation and the vergence.

For the above object, according to the present invention, there is provided variable power spectacles that includes a pair of visual optical systems, which include:

a first adjusting mechanism for adjusting focal power of the visual optical systems;

a second adjusting mechanism for adjusting prismatic power of the visual optical systems; and a linking mechanism for associating the adjustment by the first adjusting mechanism with the adjustment by the second adjusting mechanism to link one of the adjustments with the other adjustment.

Namely, the characteristic point of the present invention is to change the prismatic power of the visual optical systems as the focal power varies.

With this construction, variation of an object distance changes both of the focal power and the prismatic power, which keeps the balance between the accommodation and the vergence.

The linking mechanism may control the second adjusting mechanism to increase the prismatic power in base-in direction as the first adjusting mechanism increases the focal power. In such a case, it is preferable to satisfy the following condition:

$$0 < PR/AD < 3.5 \tag{1}$$

where

AD [Dptr] is the additional focal power, and

PR [Δ] is the additional prismatic power in base-in direction.

In one embodiment, each of the visual optical systems includes a variable power lens and a variable angle prism. In such a case, the first adjusting mechanism adjusts the focal power of the variable power lens, and the second adjusting mechanism adjusts the apex angle of the variable angle prism. When the object distance varies, the apex angle of the variable angle prism is changed as the focal power is changed, which keeps the balance between the accommodation and the vergence of eyes.

In the other embodiments, each of the visual optical systems includes a variable power lens. In such a case, the first adjusting mechanism adjusts the focal power of the variable power lens, and the second adjusting mechanism moves the optical center of the variable power lens in a temporal side or a nasal side. The movement of the optical center in the temporal side or the nasal side changes the prismatic power of the variable power lens as well as the change of the apex angle of the variable angle prism, which also keeps the balance between the accommodation and the vergence of eyes.

The term "optical center" is defined as the intersection of the straight line that links a center of paraxial curvature of the front surface (object side) and a center of paraxial curvature of the back surface (eye side) with the front surface. Further, the position of the optical center when no additional focal power is added is defined as an "original optical center. That is, the original optical center is the optical center at the minimum focal power.

The variable power lens can be moved as a whole to move the optical center, while the mechanical construction becomes too complicated to apply it to the spectacles. Thus, the variable power lens is preferable to change the focal power and the position of the optical center by deformation thereof. In such a case, the first and second adjusting mechanisms deform the variable power lens to simultaneously adjust the focal power and the prismatic power.

When the variable power lens has a positive focal power, the optical center should be moved in the nasal side as the focal power is added to increase the absolute value thereof. When the variable power lens has a negative focal power, the optical center should be moved in the temporal side as the focal power is added to decrease the absolute value thereof.

Further, when the variable power lens has a positive focal power (AD>0.5, DF+AD>0, where DF [Dptr] is the minimum value of the focal power of the variable power lens), a moving amount IN [mm] of the optical center in the nasal side direction with reference to the original optical center preferably satisfies the following condition (2):

$$0 < IN < 35 \times AD/(DF+AD) \tag{2}$$

Still further, when the variable power lens has a negative focal power (AD>0.5, DF+AD<0), a moving amount OUT

[mm] of the optical center in the temporal side direction with reference to the original optical center preferably satisfies the following condition (3):

$$0 < \text{OUT} \leftarrow -35 \times AD/(DF+AD) \qquad (3).$$

DESCRIPTION OF THE EMBODIMENTS

Three embodiments of the variable power spectacles according to the present invention will be described hereinafter. The variable power spectacles include a pair of visual optical systems. The visual optical system of a first embodiment is provided with a variable power lens and a variable angle prism. The visual optical system of a second or third embodiment only includes a variable power lens that can be deformed to change the focal power and the position of an optical center.

[First Embodiment]

Figure 1:
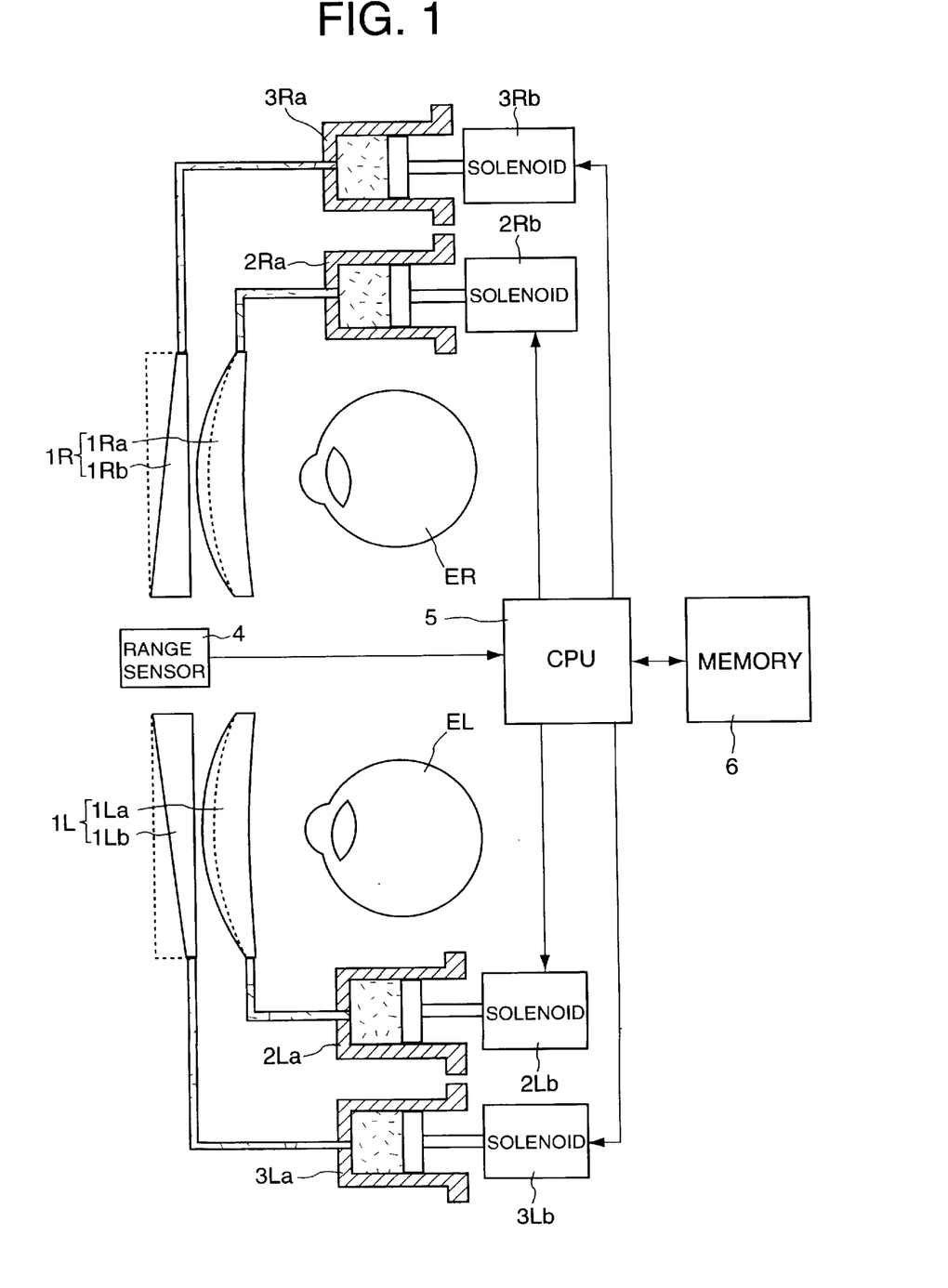
FIG. 1 shows a system outline of variable power spectacles according to a first embodiment.

The variable power spectacles according to the first embodiment include, as shown in FIG. 1, a pair of visual optical systems 1R and 1L corresponding to left and right eyes ER and EL, and adjusting mechanisms for adjusting a focal power and a prismatic power of each of the visual optical systems 1R and 1L.

The visual optical systems 1R and 1L include variable power lenses 1Ra and 1La and variable angle prisms 1Rb and 1Lb. Each of the variable power lenses 1Ra and 1La has a flexible hull that is filled by transparent liquid as with the conventional lens disclosed in the Japanese Patent Provisional Publication Nos. Sho 55-64209 or Sho 63-24217. The front surface of each of the variable power lenses 1Ra and 1La becomes deformed between the smallest curvature (the largest radius of curvature) condition shown by a dashed line and the largest curvature (the smallest radius of curvature) condition shown by a solid line according to infused volume of the transparent liquid. The continuous or stepwise deformations of the front surfaces change the focal power of the variable power lenses 1Ra and 1La.

Each of the variable angle prisms 1Rb and 1Lb is constructed from a pair of hard transparent plates and a flexible membrane that seals the space between the hard transparent plates. The inner space is filled by transparent liquid. The front surface of the variable angle prism inclines to change the apex angle at the temporal side according to volume of the transparent liquid. Therefore, the variable angle prism becomes deformed between a parallel condition as shown by a dashed line and an inclined condition as shown by a solid line. The continuous or stepwise deformations of the variable angle prisms 1Rb and 1Lb change the prismatic power.

A first pump 2Ra is connected to the variable power lens 1Ra to adjust the volume of the transparent liquid infused in the lens. The first pump 2Ra and a solenoid 2Rb that drives a piston of the first pump 2Ra constitute a first adjusting mechanism for adjusting the focal power of the variable power lens 1Ra.

Further, a second pump 3Ra is connected to the variable angle prism 1Rb to adjust the volume of the transparent liquid infused in the prism. The second pump 3Ra and a solenoid 3Rb that drives a piston of the second pump 3Ra constitute a second adjusting mechanism for adjusting the prismatic power of the variable angle prism 1Rb.

In the same manner, a third pump 2La that is connected to the variable power lens 1La and a solenoid 2Lb constitute the first adjusting mechanism, a fourth pump 3La that is connected to the variable angle prism 1Lb and a solenoid 3Lb constitute the second adjusting mechanism.

The variable power spectacles further include a range sensor 4 that measures the object distance, a CPU 5 that controls the solenoids 2Rb, 2Lb, 3Rb and 3Lb and a memory 6 in which relationship between the object distance and the required drive amount of the solenoids is stored. The CPU 5 addresses the memory 6 according to an object distance signal from the range sensor 4 to read the drive amount of the solenoids 2Rb and 2Lb, and then the CPU 5 controls the solenoids 2Rb and 2Lb to adjust the focal power of the variable power lenses 1Ra and 1La. At the same time, the CPU 5 addresses the memory 6 according to the object distance signal to read the drive amount of the solenoids 3Rb and 3Lb corresponding to the additional focal power, and then the CPU 5 controls the solenoids 3Rb and 3Lb to adjust the prismatic power of the variable angle prisms 1Rb and 1Lb.

Namely, the CPU 5 has a function of a linking mechanism for associating the adjustment by the first adjusting mechanism with the adjustment by the second adjusting mechanism to link one of the adjustments with the other adjustment.

The CPU 5 controls each of the solenoids such that the focal power and the prismatic power satisfy the following condition (1):

$$0 < PR/AD < 3.5 \qquad (1)$$

where

AD [Dptr] is the additional focal power, and

PR [Δ] is the additional prismatic power.

When the condition (1) is satisfied, the focal power and the prismatic power can be well balanced to each other, which enables a comfortable binocular vision.

[Second Embodiment]

Figure 2:
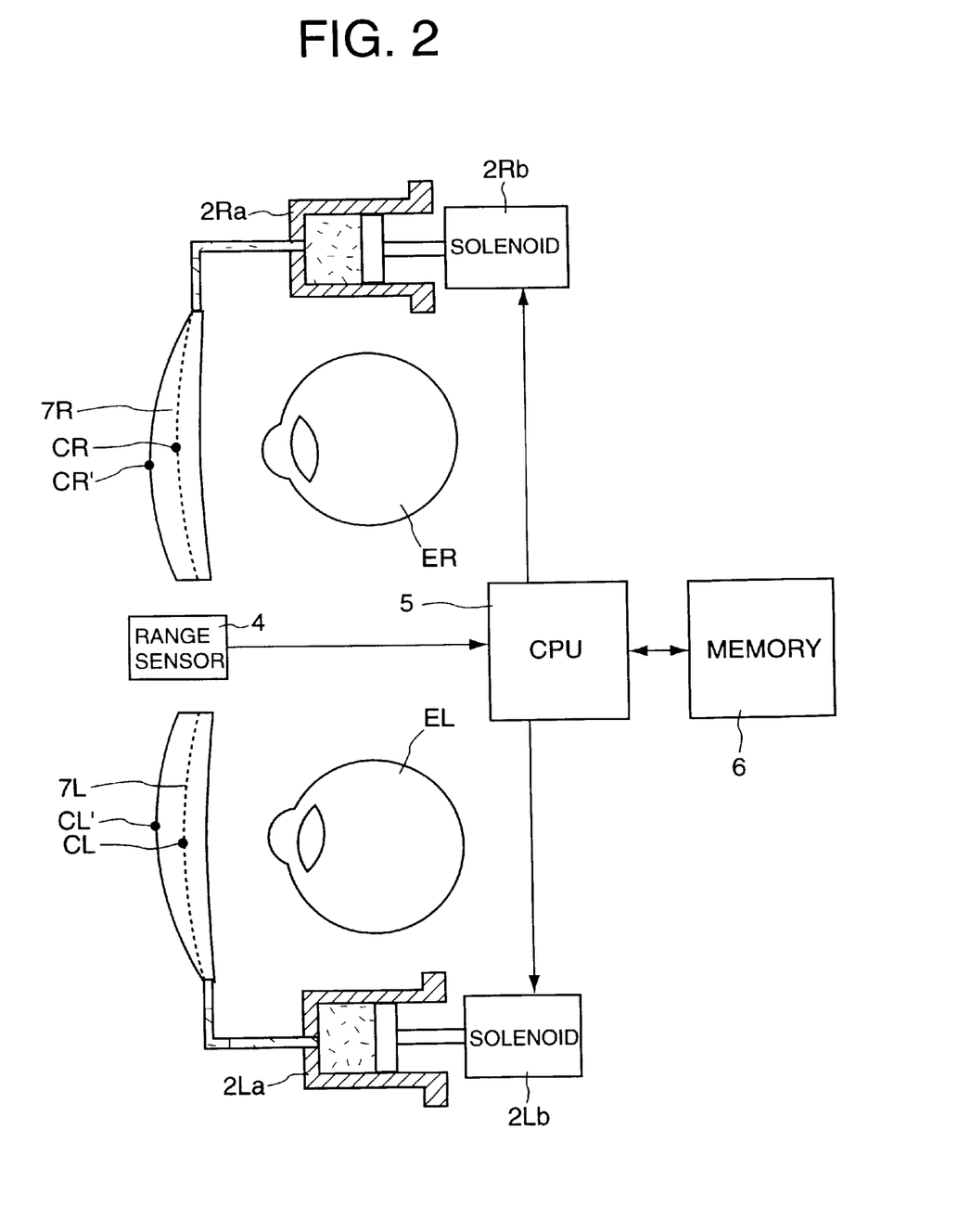
FIG. 2 shows a system outline of variable power spectacles according to a second embodiment.

The variable power spectacles according to the second embodiment includes, as shown in FIG. 2, a pair of variable power lenses 7R and 7L corresponding to left and right eyes ER and EL, and adjusting mechanisms for adjusting a focal power and for moving an optical center of each of the variable power lenses. In the second embodiment, the visual optical systems only include the variable power lenses 7R and 7L.

Each of the variable power lenses 7R and 7L has a flexible hull that is filled by transparent liquid and it becomes deformed according to the infused volume of the transparent liquid as with the first embodiment. The front surface of the lens is formed of a flexible hull and the back surface thereof is formed of a hard hull. A stopper is sandwiched between the front and back surfaces at the temporal side to keep the edge thickness of the lens. The nasal side is sealed by a flexible membrane to allow the variation of the edge thickness of the lens. The change of an inner pressure due to infusing/discharging the transparent liquid changes the curvature of the front surface and the edge thickness at the nasal side.

The front surface of each of the variable power lenses 7R and 7L becomes deformed between the smallest curvature condition shown by a dashed line and the largest curvature condition shown by a solid line according to infused volume of the transparent liquid. The continuous or stepwise deformations of the front surfaces change the focal power of the variable power lenses 7R and 7L. Further, the front surfaces become deformed asymmetrically with respect to the original optical centers CR and CL that are the optical centers at the minimum focal power, that is, at the smallest curvature condition. The optical centers move to nasal side as the curvature increases, and at the largest curvature condition, the optical centers CR' and CL' are located at the nasal side of the original optical centers.

The movements of the optical centers of the variable power lenses 7R and 7L change the prismatic power as well as the change of the apex angle of a prism, which keeps the balance between the accommodation and the vergence of the eyes ER and EL.

A first pump 2Ra is connected to the variable power lens 7R to adjust the volume of the transparent liquid infused in the lens. The first pump 2Ra and a solenoid 2Rb that drives a piston of the first pump 2Ra constitute an adjusting mechanism for deforming the variable power lens 7R to simultaneously adjust the focal power and the prismatic power.

In the same manner, a second pump 2La that is connected to the variable power lens 7L and a solenoid 2Lb constitute the adjusting mechanism.

The variable power spectacles according to the second embodiment also include a range sensor 4, a CPU 5 and a memory 6 as with the first embodiment. The CPU 5 addresses the memory 6 according to an object distance signal from the range sensor 4 to read the drive amount of the solenoids 2Rb and 2Lb, and then the CPU 5 controls the solenoids 2Rb and 2Lb to adjust the focal power and the prismatic power of the variable power lenses 7R and 7L.

When the variable power lens has a positive focal power, the optical center is moved in the nasal side as the focal power is added to increase the absolute value thereof. When the variable power lens has a negative focal power, the optical center is moved in the temporal side as the focal power is added to decrease the absolute value thereof.

The variable power lens having positive focal power satisfies the condition (2) and that having negative focal power satisfies the condition (3):

$$0 < IN < 35 \times AD/(DF+AD) \quad (2)$$

$$0 < OUT < -35 \times AD/(DF+AD) \quad (3)$$

where
- DF [Dptr] is the minimum value of the focal power of the variable power lens;
- AD [Dptr] is an additional focal power;
- IN [mm] is a moving amount of the optical center in the nasal side direction with reference to the original optical center; and
- OUT [mm] is a moving amount of the optical center in the temporal side direction with reference to the original optical center.

When the condition (2) or (3) is satisfied, the variation of the focal power and the variation of the prismatic power can be well balanced, which enables the comfortable binocular vision.

[Third Embodiment]

Figure 3:
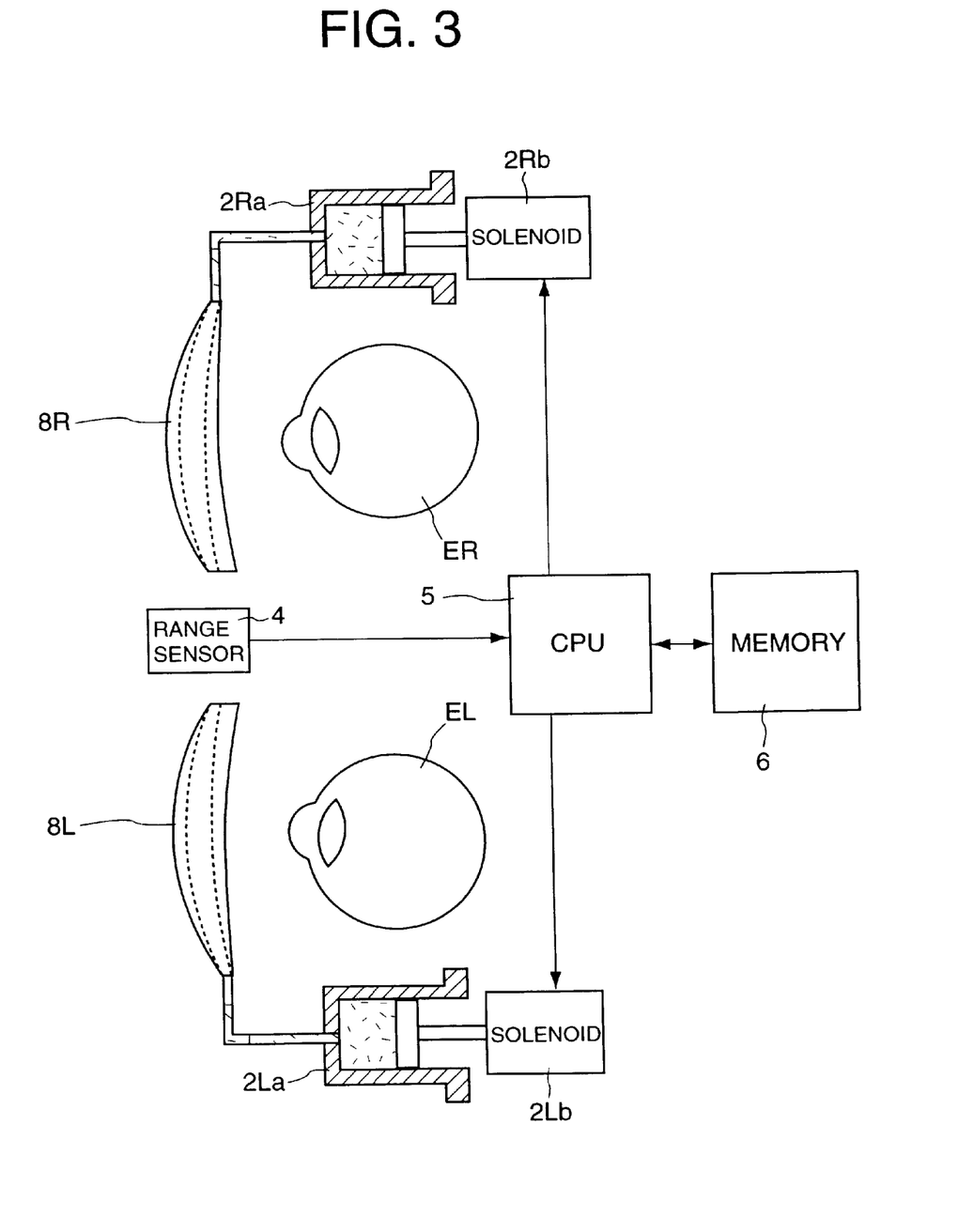
FIG. 3 shows a system outline of variable power spectacles according to a third embodiment.

The variable power spectacles according to the third embodiment includes, as shown in FIG. 3, a pair of variable power lenses 8R and 8L corresponding to left and right eyes ER and EL, and adjusting mechanisms for adjusting a focal power and for moving an optical center of each of the variable power lenses. In the third embodiment, the visual optical systems only include the variable power lenses 8R and 8L.

Each of the variable power lenses 8R and 8L has a flexible hull that is filled by transparent liquid and it becomes deformed according to the infused volume of the transparent liquid as with the second embodiment. The front surface of the lens is formed of a flexible hull. The back surface of the lens is formed of a hard hull and the thickness at the nasal side can be changed as well as the second embodiment. The front surface changes the curvature thereof to vary the focal power and the back surface changes the inclination thereof to vary the prismatic power according to the infused volume of the transparent liquid.

When the infused volume has the minimum value, the curvature of the front surface of each of the variable power lenses 8R and 8L becomes the smallest as shown by a dashed line, and the inclination of the back surface is also the smallest as shown by a dashed line. When the infused volume has the maximum value, the curvature of the front surface becomes the largest as shown by a solid line, and the inclination of the back surface is also the largest as shown by a solid line.

The adjusting mechanism is the same as the second embodiment. Namely, first and second pumps 2Ra and 2La, solenoids 2Rb and 2Lb, a range sensor 4, a CPU 5 and a memory 6 are included. The CPU 5 addresses the memory 6 according to an object distance signal from the range sensor 4 to read the drive amount of the solenoids 2Rb and 2Lb, and then the CPU 5 controls the solenoids 2Rb and 2Lb to adjust the focal power and the prismatic power of the variable power lenses 8R and 8L.

Moreover, the concept of the present invention is to change the prismatic power in connection with the change of the focal power of the lens, the range sensor 4, the CPU 5 and the memory 6 or the like are not essential elements. For instance, the present invention covers a manual adjusting mechanism that is manually adjusted by a user according to the object distance.

Six concrete examples according to the first and second embodiments will be described hereinafter.

FIRST EXAMPLE

A first example corresponds with the first embodiment above described. Namely, the variable power spectacles of the first example include, as shown FIG. 4, a pair of visual optical systems that are provided with variable power lenses 10R and 10L, and variable angle prisms 15R and 15L.

It is assumed that a distance EP between vertexes of a back surface of a lens and a cornea is 12 mm and a pupillary distance PD is 60 mm in this and the following examples.

Figure 4:
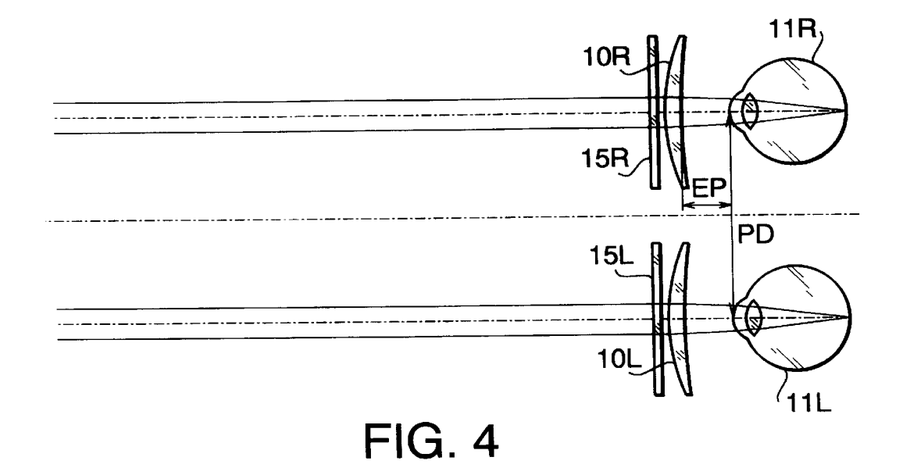
FIG. 4 shows an optical system including eyes and variable power spectacles according to a first example at an infinite object distance.

The variable power lenses 10R and 10L are positive lenses for hypermetropia. The minimum focal power DF of the lenses are +4.0 Dptr when the additional focal power AD is zero. In this minimum focal power condition, the variable power lenses 10R and 10L correct for hypermetropic eyes 11R and 11L such that the accommodation of the eyes become zero when the eyes 11R and 11L focus an infinite object through the lenses 10R and 10L. In the minimum focal power condition, the variable angle prisms 15R and 15L have no prismatic power. FIG. 4 shows an optical system including eyes and variable power spectacles according to the first example when the user looks at an infinite object.

Figure 5:
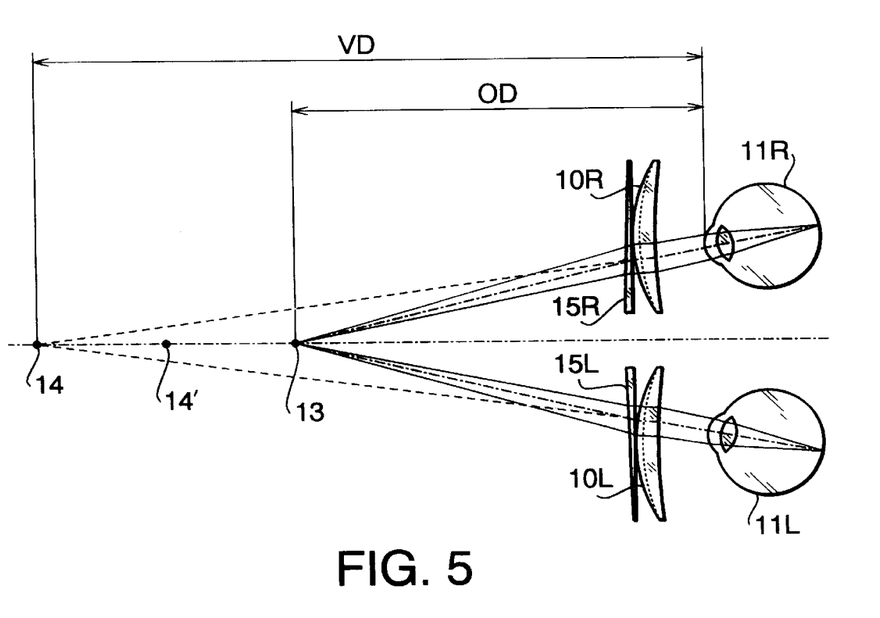
FIG. 5 shows an optical system including eyes and variable power spectacles according to the first example at a finite object distance.

When the user who wears the spectacles of the first example looks at a finite object 13 as shown in FIG. 5, the additional focal power AD is added to the variable power lenses 10R and 10L to take the accommodation load off the user's eyes 11R and 11L. At the same time, the apex angles of the variable angle prisms 15R and 15L are changed to reduce the change of the vergence of the eyes.

For instance, when an object distance OD is 250 mm (−4.00 Dptr) in front of the cornea, the additional prismatic power in base-in direction PR [Δ] due to adjustment of the variable angle prism varies as shown in TABLE 1 as the additional power AD is changed from 0.00 Dptr to 4.20 Dptr. TABLE 1 shows the accommodation AC [Dtpr], the vergence VG [MW] and the vergence distance VD [mm] of the eye that are changed as a result of the adjustments of the lens and the prism. TABLE 1 also shows the value of PR/AD that is defined in the condition (1) described above.

TABLE 1

| OD | AD | PR | AC | VG | VD | PR/AD |
|---|---|---|---|---|---|---|
| 250 | 0.00 | 0.05 | 4.40 | 4.40 | 227 | — |
| 250 | 1.00 | 3.04 | 3.40 | 3.40 | 294 | 3.04 |
| 250 | 2.00 | 6.03 | 2.36 | 2.36 | 423 | 3.02 |
| 250 | 3.00 | 9.02 | 1.31 | 1.31 | 766 | 3.01 |
| 250 | 4.20 | 12.60 | 0.00 | 0.00 | ∞ | 3.00 |

In the fist example, the condition (1) is satisfied under any adjustments, which balances the accommodation and the vergence of the eye due to the adjustments of the focal power and the prismatic power, resulting a comfortable binocular vision.

For instance, when the additional focal power AD equals 2.00 Dptr, an image of the object 13 is formed at 544 mm (1.84 Dptr) behind the cornea, the eyes 11R and 11L focus the object 13 with the accommodation by 2.36 Dptr. Since the additional prismatic power in the base-in direction 6.03 Δ is added to the variable angle prisms 15R and 15L, the eyes 11R and 11L adjust the vergence by 2.36 MW to enable the binocular vision. The vergence distance VD is 423 mm in front of the cornea, the object 13 appears to be located at the position 14 for the eyes 11R and 11L.

Figure 6:
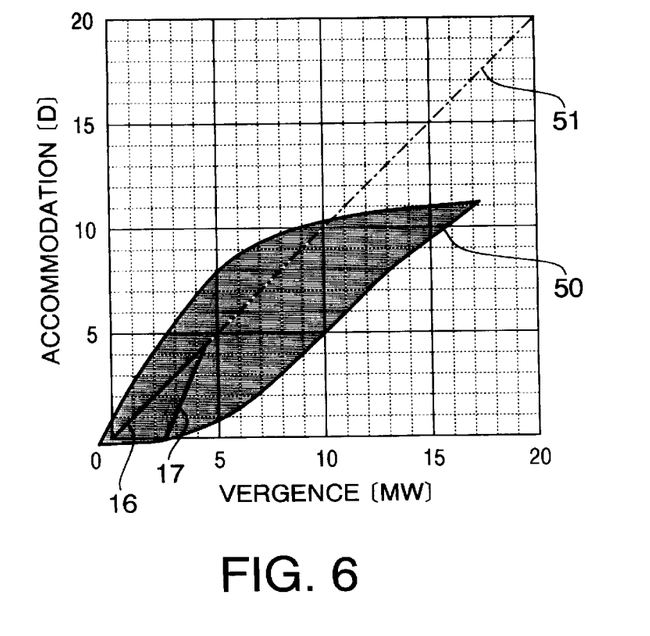
FIG. 6 is a graph showing relationships between the accommodation and the vergence of eyes when the variable power spectacles of the first and second examples are worn.

FIG. 6 is a graph showing the relationship between the accommodation and the vergence of the eye. The area surrounded by the curve 50 represents the allowable range of the binocular vision. The eye of the user who wears the variable power spectacles of the first example is required to change the accommodation AC and the vergence VG along a locus 16 in FIG. 6, when the additional focal power is changed from 0.00 Dptr to 4.20 Dtpr. The locus 16 is included in the area surrounded by the curve 50.

Further, the locus 16 is coincident with a straight line 51 that represents AC=VG. Accordingly, the variable power lenses and the variable angle prisms are controlled such that the accommodation and the vergence of the eye are in exact agreement with each other in the first example.

SECOND EXAMPLE

A second example corresponds with the first embodiment as with the first example. Namely, the variable power spectacles of the second example include a pair of visual optical systems that are provided with variable power lenses and variable angle prisms. The second example is not shown in figure because the basic construction is the same as the first example.

The variable power lenses are positive lenses whose minimum focal power DF is +4.0 Dptr when the additional focal power AD is zero. When an object distance OD is 250 mm (−4.00 Dptr) in front of the cornea, the additional prismatic power in base-in direction PR [Δ] due to adjustment of the variable angle prism varies as shown in TABLE 2 as the additional power AD is changed from 0.00 Dptr to 4.20 Dtpr. TABLE 2 also shows the accommodation AC [Dtpr], the vergence VG [MW], the vergence distance VD [mm] and the value of PR/AD that is defined in the condition (1) described above.

TABLE 2

| OD | AD | PR | AC | VG | VD | PR/AD |
|---|---|---|---|---|---|---|
| 250 | 0.00 | 0.05 | 4.40 | 4.40 | 227 | — |
| 250 | 1.00 | 1.50 | 3.40 | 3.97 | 252 | 1.50 |
| 250 | 2.00 | 3.00 | 2.36 | 3.51 | 285 | 1.50 |
| 250 | 3.00 | 4.50 | 1.31 | 3.02 | 331 | 1.50 |
| 250 | 4.20 | 6.30 | 0.00 | 2.41 | 415 | 1.50 |

In the second example, the condition (1) is satisfied under any adjustments, which balances the accommodation and the vergence of the eye due to the adjustments of the focal power and the prismatic power, resulting a comfortable binocular vision.

For instance, when the additional focal power AD equals 2.00 Dptr, the eyes focus the object with the accommodation by 2.36 Dptr. Since the additional prismatic power in the base-in direction 3.00 Δ is added to the variable angle prisms, the eyes adjust the vergence by 3.51 MW to enable the binocular vision. The vergence distance VD is 285 mm in front of the cornea, the object appears to be located at the position 14' (see FIG. 5) for the eyes. The position 14' is closer to the actual object 13 than the position 14.

The eye of the user who wears the variable power spectacles of the second example is required to change the accommodation AC and the vergence VG along a locus 17 in FIG. 6, when the additional focal power is changed from 0.00 Dptr to 4.20 Dtpr. The locus 17 is also included in the area surrounded by the curve 50.

Further, since the variation of the vergence is smaller than that of the accommodation in the second example, these are not coincident with each other. However, the load of the eye decreases as compared with the conventional variable power spectacles, and the second example reduces mismatch between the actual position and the apparent position of the object as compared with the first example.

THIRD EXAMPLE

A third example corresponds with the first embodiment above described. Namely, the variable power spectacles of the third example include, as shown FIG. 7, a pair of visual optical systems that are provided with variable power lenses 20R and 20L, and variable angle prisms 25R and 25L.

Figure 7:
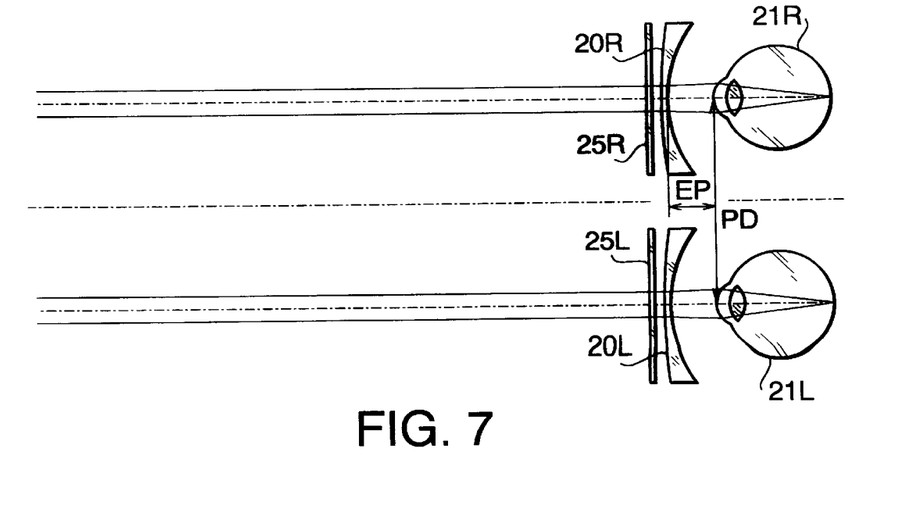
FIG. 7 shows an optical system including eyes and variable power spectacles according to a third example at an infinite object distance.

The variable power lenses 20R and 20L are negative lenses for myopia. The minimum focal power DF of the lenses are −6.0 Dptr when the additional focal power AD is zero. In this minimum focal power condition, the variable power lenses 20R and 20L correct for myopic eyes 21R and 21L such that the accommodation of the eyes become zero when the eyes 21R and 21L focus an infinite object through the lenses 20R and 20L. In the minimum focal power condition, the variable angle prisms 25R and 25L have no prismatic power. FIG. 7 shows an optical system including eyes and variable power spectacles according to the third example when the user looks at an infinite object.

Figure 8:
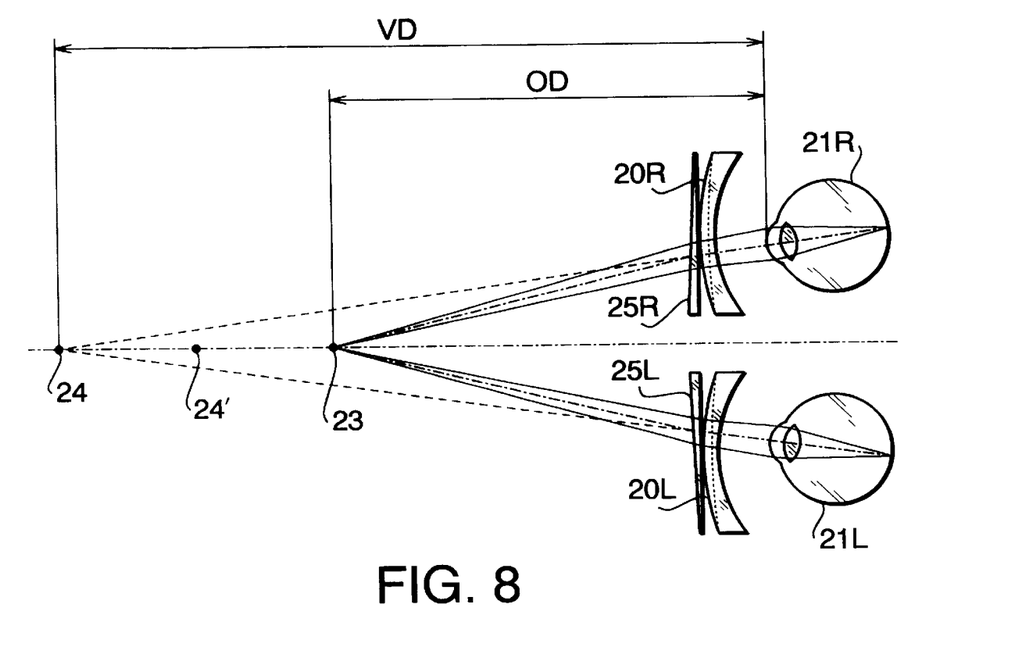
FIG. 8 shows an optical system including eyes and variable power spectacles according to the third example at a finite object distance.

When the user who wears the spectacles of the third example looks at a finite object 23 as shown in FIG. 8, the additional focal power AD is added to the variable power lenses 20R and 20L to take the accommodation load off the user's eyes 21R and 21L. At the same time, the apex angles of the variable angle prisms 25R and 25L are changed to reduce the change of the vergence of the eyes.

For instance, when an object distance OD is 250 mm (−4.00 Dptr) in front of the cornea, the additional prismatic power in base-in direction PR [Δ] due to adjustment of the variable angle prism varies as shown in TABLE 3 as the additional power AD is changed from 0.00 Dptr to 4.20 Dptr. TABLE 3 also shows the accommodation AC [Dtpr], the vergence VG [MW], the vergence distance VD [mm] and the value of PR/AD that is defined in the condition (1) described above.

TABLE 3

| OD | AD | PR | AC | VG | VD | PR/AD |
|---|---|---|---|---|---|---|
| 250 | 0.00 | 0.03 | 3.49 | 3.49 | 286 | — |
| 250 | 1.00 | 3.02 | 2.69 | 2.69 | 372 | 3.02 |
| 250 | 2.00 | 6.00 | 1.87 | 1.87 | 535 | 3.00 |
| 250 | 3.00 | 9.00 | 1.03 | 1.03 | 969 | 3.00 |
| 250 | 4.20 | 12.60 | 0.00 | 0.00 | ∞ | 3.00 |

In the third example, the condition (1) is satisfied under any adjustments, which balances the accommodation and the vergence of the eye due to the adjustments of the focal power and the prismatic power, resulting a comfortable binocular vision.

For instance, when the additional focal power AD equals 2.00 Dptr, an image of the object 23 is formed at 134 mm (−7.47 Dptr) in front of the cornea, the eyes 21R and 21L focus the object 23 with the accommodation by 1.87 Dptr. Since the additional prismatic power in the base-in direction 6.00 Δ is added to the variable angle prisms 25R and 25L, the eyes 21R and 21L adjust the vergence by 1.87 MW to enable the binocular vision. The vergence distance VD is 535 mm in front of the cornea, the object 23 appears to be located at the position 24 for the eyes 21R and 21L.

Figure 9:
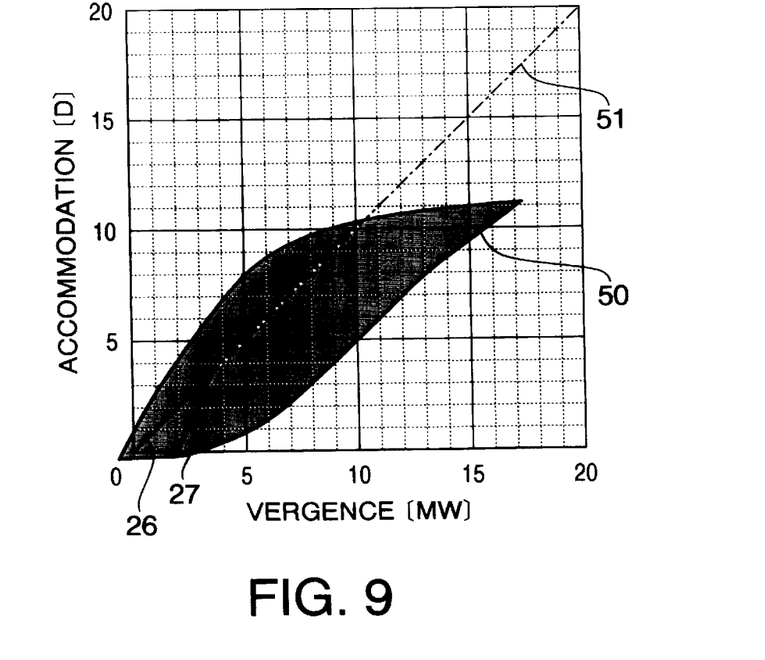
FIG. 9 is a graph showing relationships between the accommodation and the vergence of eyes when the variable power spectacles of the third and fourth examples are worn.

FIG. 9 is a graph showing the relationship between the accommodation and the vergence of the eye. The eye of the user who wears the variable power spectacles of the third example is required to change the accommodation AC and the vergence VG along a locus 26 in FIG. 9, when the additional focal power is changed from 0.00 Dptr to 4.20 Dtpr. The locus 26 is included in the area surrounded by the curve 50, which allows the binocular vision.

Further, the locus 26 is coincident with a straight line 51 that represents AC=VG. Accordingly, the variable power lenses and the variable angle prisms are controlled such that the accommodation and the vergence of the eye are in exact agreement with each other in the third example.

FOURTH EXAMPLE

A fourth example corresponds with the first embodiment as with the third example. Namely, the variable power spectacles of the fourth example include a pair of visual optical systems that are provided with variable power lenses and variable angle prisms. The fourth example is not shown in figure because the basic construction is the same as the third example.

The variable power lenses are negative lenses whose minimum focal power DF is −6.0 Dptr when the additional focal power AD is zero. When an object distance OD is 250 mm (−4.00 Dptr) in front of the cornea, the additional prismatic power in base-in direction PR [Δ] due to adjustment of the variable angle prism varies as shown in TABLE 4 as the additional power AD is changed from 0.00 Dptr to 4.20 Dtpr. TABLE 4 also shows the accommodation AC [Dtpr], the vergence VG [MW], the vergence distance VD [mm] and the value of PR/AD that is defined in the condition (1) described above.

TABLE 4

| OD | AD | PR | AC | VG | VD | PR/AD |
|---|---|---|---|---|---|---|
| 250 | 0.00 | 0.03 | 3.49 | 3.49 | 286 | — |
| 250 | 1.00 | 1.50 | 2.69 | 3.13 | 319 | 1.50 |
| 250 | 2.00 | 3.00 | 1.87 | 2.75 | 363 | 1.50 |
| 250 | 3.00 | 4.50 | 1.03 | 2.36 | 424 | 1.50 |
| 250 | 4.20 | 6.30 | 0.00 | 1.87 | 534 | 1.50 |

In the fourth example, the condition (1) is satisfied under any adjustments, which balances the accommodation and the vergence of the eye due to the adjustments of the focal power and the prismatic power, resulting a comfortable binocular vision.

For instance, when the additional focal power AD equals 2.00 Dptr, the eyes focus the object with the accommodation by 1.87 Dptr. Since the additional prismatic power in the base-in direction 3.00 Δ is added to the variable angle prisms, the eyes adjust the vergence by 2.75 MW to enable the binocular vision. The vergence distance VD is 363 mm in front of the cornea, the object appears to be located at the position 24' (see FIG. 8) for the eyes. The position 24' is closer to the actual object 23 than the position 24.

The eye of the user who wears the variable power spectacles of the fourth example is required to change the accommodation AC and the vergence VG along a locus 27 in FIG. 9, when the additional focal power is changed from 0.00 Dptr to 4.20 Dtpr. The locus 27 is also included in the area surrounded by the curve 50.

Further, since the variation of the vergence is smaller than that of the accommodation in the fourth example, these are not coincident with each other. However, the load of the eye decreases as compared with the conventional variable power spectacles, and the fourth example reduces mismatch between the actual position and the apparent position of the object as compared with the third example.

FIFTH EXAMPLE

A fifth example corresponds with the second embodiment above described. Namely, the variable power spectacles of the fifth example include, as shown FIG. 10, a pair of variable power lenses 30R and 30L that change the curvature of front surfaces and edge thickness at the nasal side.

Figure 10:
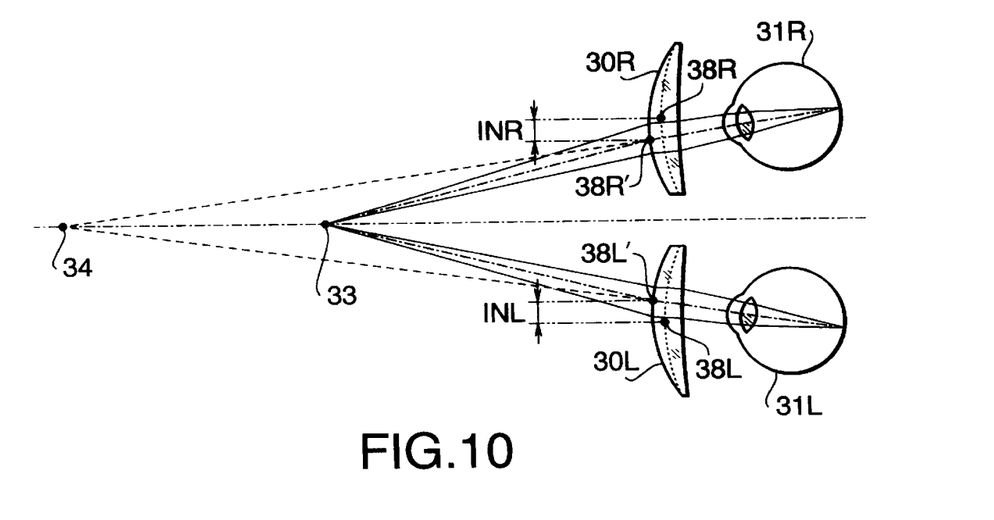
FIG. 10 shows an optical system including eyes and variable power spectacles according to a fifth example.

The variable power lenses 30R and 30L are positive lenses for hypermetropia. The minimum focal power DF of the lenses are +4.0 Dptr when the additional focal power AD is zero. In this minimum focal power condition, the variable power lenses 30R and 30L correct for hypermetropic eyes 31R and 31L such that the accommodation of the eyes become zero when the eyes 31R and 31L focus an infinite object through the lenses 30R and 30L.

In the minimum focal power condition, the front surfaces of the variable power lenses 30R and 30L are in the smallest curvature condition as shown by a dashed line in FIG. 10. In this condition, the variable power lenses have no prismatic power.

When the user who wears the spectacles of the fifth example looks at a finite object 33 as shown in FIG. 10, the additional focal power AD is added to the variable power lenses 30R and 30L to take the accommodation load off the user's eyes 31R and 31L. The optical center moves to the nasal side as the additional focal power increases. At the largest power condition, the front surfaces of the variable power lenses 30R and 30L are in the largest curvature condition as shown by a solid line in FIG. 10. In this condition, since the optical centers 38R' and 38L' are located at the nasal side with respect to the original optical centers 38R and 38L, the variable power lenses have the prismatic power in the base-in direction.

For instance, when an object distance OD is 250 mm (−4.00 Dptr) in front of the cornea, the moving amount of the optical center in the nasal side direction IN [mm] varies as shown in TABLE 5 as the additional power AD is changed from 0.00 Dtpr to 4.20 Dtpr. TABLE 5 also shows the accommodation AC [Dtpr], the vergence VG [MW], the vergence distance VD [mm] and the value of 35AD/(DF+AD) that is the upper limit of the condition (2) described above.

in front of the cornea, the object 33 appears to be located at the position 34 for the eyes 31R and 31L.

SIXTH EXAMPLE

A sixth example corresponds with the second embodiment above described. Namely, the variable power spectacles of the sixth example include, as shown FIG. 11, a pair of variable power lenses 40R and 40L that change the curvature of front surfaces and edge thickness at the nasal side.

Figure 11:
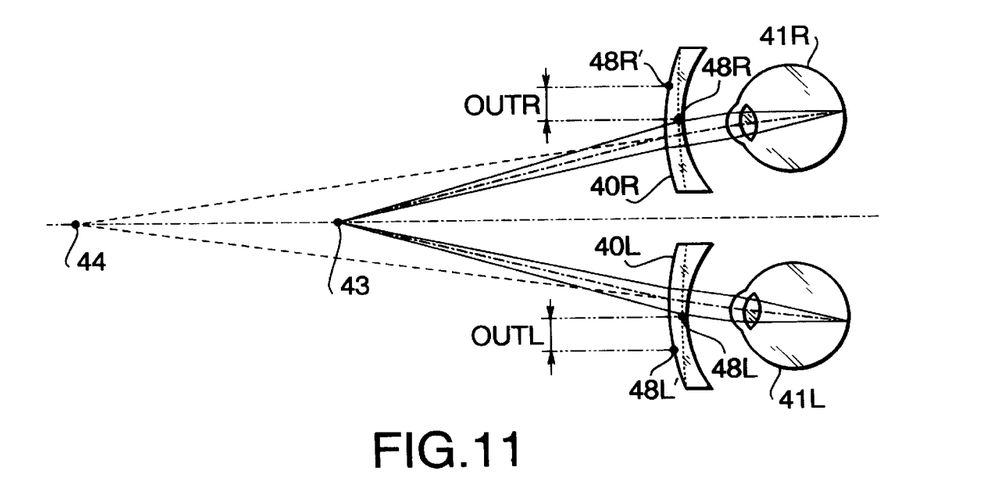
FIG. 11 shows an optical system including eyes and variable power spectacles according to a sixth example.

The variable power lenses 40R and 40L are negative lenses for myopia. The minimum focal power DF of the lenses are −6.0 Dptr when the additional focal power AD is zero. In this minimum focal power condition, the variable power lenses 40R and 40L correct for myopic eyes 41R and 41L such that the accommodation of the eyes become zero when the eyes 41R and 41L focus an infinite object through the lenses 40R and 40L.

In the minimum focal power condition, the front surfaces of the variable power lenses 40R and 40L are in the smallest curvature condition as shown by a dashed line in FIG. 11. In this condition, the variable power lenses have no prismatic power.

When the user who wears the spectacles of the sixth example looks at a finite object 43 as shown in FIG. 11, the additional focal power AD is added to the variable power lenses 40R and 40L to take the accommodation load off the user's eyes 41R and 41L. The optical center moves to the temporal side as the additional focal power increases. At the largest power condition, the front surfaces of the variable power lenses 40R and 40L are in the largest curvature condition as shown by a solid line in FIG. 11. In this condition, since the optical centers 48R' and 48L' are located at the temporal side with respect to the original optical centers 48R and 48L, the variable power lenses have the prismatic power in the base-in direction.

For instance, when an object distance OD is 250 mm (−4.00 Dptr) in front of the cornea, the moving amount of the optical center in the temporal side direction OUT [mm] varies as shown in TABLE 6 as the additional power AD is changed from 0.00 Dtpr to 4.20 Dtpr. TABLE 6 also shows the accommodation AC [Dtpr], the vergence VG [MW], the vergence distance VD [mm] and the value of −35AD/(DF+AD) that is the upper limit of the condition (3) described above.

TABLE 5

| OD | AD | IN | AC | VG | VD | $\frac{35\,AD}{DF+AD}$ |
| --- | --- | --- | --- | --- | --- | --- |
| 250 | 0.00 | 0.1 | 4.40 | 4.40 | 227 | 0.0 |
| 250 | 1.00 | 6.1 | 3.40 | 3.40 | 294 | 7.0 |
| 250 | 2.00 | 10.1 | 2.36 | 2.36 | 423 | 11.7 |
| 250 | 3.00 | 12.9 | 1.31 | 1.31 | 766 | 15.0 |
| 250 | 4.20 | 15.4 | 0.00 | 0.00 | ∞ | 17.9 |

TABLE 6

| OD | AD | OUT | AC | VG | VD | $\frac{-35\,AD}{DF+AD}$ |
| --- | --- | --- | --- | --- | --- | --- |
| 250 | 0.00 | 0.0 | 3.49 | 3.49 | 286 | 0.0 |
| 250 | 1.00 | 6.0 | 2.69 | 2.69 | 372 | 7.0 |
| 250 | 2.00 | 15.0 | 1.87 | 1.87 | 535 | 17.5 |
| 250 | 3.00 | 30.0 | 1.03 | 1.03 | 969 | 35.0 |
| 250 | 4.20 | 70.1 | 0.00 | 0.00 | ∞ | 81.7 |

In the fifth example, the condition (2) is satisfied under any adjustments, which balances the accommodation and the vergence of the eye due to the adjustment of the focal power and the movement of the optical center, resulting a comfortable binocular vision.

For instance, when the additional focal power AD equals 2.00 Dptr, the eyes 31R and 31L focus the object 33 with the accommodation by 2.36 Dptr. Since the optical centers move by 10.1 mm in the nasal side, the prismatic power varies, the eyes 31R and 31L adjust the vergence by 2.36 MW to enable the binocular vision. The vergence distance VD is 423 mm In the sixth example, the condition (3) is satisfied under any adjustments, which balances the accommodation and the vergence of the eye due to the adjustment of the focal power and the movement of the optical center, resulting a comfortable binocular vision.

For instance, when the additional focal power AD equals 2.00 Dptr, the eyes 41R and 41L focus the object 43 with the accommodation by 1.87 Dptr. Since the optical centers move by 15.0 mm in the temporal side, the prismatic power varies, the eyes 41R and 41L adjust the vergence by 1.87 MW to enable the binocular vision. The vergence distance VD is 535 mm in front of the cornea, the object 43 appears to be located at the position 44 for the eyes 41R and 41L.

Further, the moving amounts IN and OUT in the fifth and sixth examples are defined such that the accommodation is completely coincident with the vergence. On the other hand, the moving amounts IN and OUT may be about half as compared with the fifth and sixth embodiments to reduce the mismatch between the actual position and the apparent position of the object.

The present disclosure relates to the subject matter contained in Japanese Patent Application No. HEI 10-350385, filed on Dec. 9, 1998, which is expressly incorporated herein by reference in its entirety.

What is claimed is:

1. Variable power spectacles that includes a pair of visual optical systems, said spectacles comprising:
   a first adjusting mechanism for adjusting focal power of said visual optical systems;
   a second adjusting mechanism for adjusting prismatic power of said visual optical systems; and
   a linking mechanism for associating the adjustment by said first adjusting mechanism with the adjustment by said second adjusting mechanism to link one of said adjustments with the other adjustment.

2. The variable power spectacles according to claim 1, wherein said linking mechanism controls said second adjusting mechanism to increase said prismatic power in base-in direction as said first adjusting mechanism increases said focal power.

3. The variable power spectacles according to claim 2, wherein $$0<PR/AD<3.5$$

where
   AD [Dptr] is the additional focal power, and
   PR [Δ] is the additional prismatic power in base-in direction.

4. The variable power spectacles according to claim 1, wherein each of said visual optical systems includes a variable power lens and a variable angle prism, said first adjusting mechanism adjusting the focal power of said variable power lens, and said second adjusting mechanism adjusting the apex angle of said variable angle prism.

5. The variable power spectacles according to claim 1, wherein each of said visual optical systems includes a variable power lens, said first adjusting mechanism adjusting the focal power of said variable power lens, and said second adjusting mechanism moving the optical center of said variable power lens in a temporal side or a nasal side.

6. The variable power spectacles according to claim 5, wherein said variable power lens changes the focal power and the position of the optical center by deformation thereof, said first and second adjusting mechanisms deforming said variable power lens to simultaneously adjust the focal power and the prismatic power.

7. The variable power spectacles according to claim 6, wherein said first and second adjusting mechanisms deform a front surface or a back surface of said variable power lens to change the focal power and the prismatic power.

8. The variable power spectacles according to claim 6, wherein said first adjusting mechanism deforms one of front and back surfaces of said variable power lens to change the focal power and said second adjusting mechanism deforms the other surface to change the prismatic power.

9. The variable power spectacles according to claim 5, wherein said variable power lens has a positive focal power, and wherein the optical center moves to the nasal side as the focal power is added to increase absolute value thereof.

10. The variable power spectacles according to claim 9, wherein said variable power lens satisfies the following conditions:

$$AD>0.5$$

$$DF+AD>0$$

$$0<IN<35\times AD/(DF+AD)$$

where
   DF [Dptr] is the minimum value of the focal power of said variable power lens;
   AD [Dptr] is an additional focal power; and
   IN [mm] is a moving amount of the optical center in the nasal side direction with reference to the optical center at the minimum focal power.

11. The variable power spectacles according to claim 5, wherein said variable power lens has a negative focal power, and wherein the optical center moves to the temporal side as the focal power is added to decrease absolute value thereof.

12. The variable power spectacles according to claim 11, wherein said variable power lens satisfies the following conditions:

$$AD>0.5$$

$$DF+AD<0$$

$$0<OUT<-35\times AD/(DF+AD)$$

where
   DF [Dptr] is the minimum value of the focal power of said variable power lens;
   AD [Dptr] is an additional focal power; and
   OUT [mm] is a moving amount of the optical center in the temporal side direction with reference to the optical center at the minimum focal power.

13. Variable power spectacles comprising:
   a pair of variable power lenses, each of said variable power lenses being able to change the focal power and the position of the optical center by deformation thereof; and
   an adjusting mechanism for deforming said variable power lenses to simultaneously adjust the focal power and the optical center.

14. The variable power spectacles according to claim 13, wherein said variable power lens has a positive focal power, and wherein the optical center moves to the nasal side as the focal power is added to increase absolute value thereof.

15. The variable power spectacles according to claim 14, wherein said variable power lens satisfies the following conditions:

$$AD>0.5$$

$$DF+AD>0$$

$$0<IN<35\times AD/(DF+AD)$$

where
- DF [Dptr] is the minimum value of the focal power of said variable power lens;
- AD [Dptr] is an additional focal power; and
- IN [mm] is a moving amount of the optical center in the nasal side direction with reference to the optical center at the minimum focal power.

16. The variable power spectacles according to claim 13, wherein said variable power lens has a negative focal power, and wherein the optical center moves to the temporal side as the focal power is added to decrease absolute value thereof.

17. The variable power spectacles according to claim 16, wherein sid variable power lens satisfies the following conditions:

$$AD > 0.5$$

$$DF + AD < 0$$

$$0 < OUT < -35 \times AD/(DF+AD)$$

where
- DF [Dptr] is the minimum value of the focal power of said variable power lens;
- AD [Dptr] is an additional focal power; and
- OUT [mm] is a moving amount of the optical center in the temporal side direction with reference to the optical center at the minimum focal power.

* * * * *